US009166985B2

(12) United States Patent
Trauberg (10) Patent No.: US 9,166,985 B2
(45) Date of Patent: Oct. 20, 2015

(54) METHOD FOR PRIORITIZING NETWORKS IN A TELECOMMUNICATIONS TERMINAL HAVING DIGITAL RIGHTS MANAGEMENT CHARACTERISTICS (75) Inventor: Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 2725 days.

(21) Appl. No.: 11/597,140

(22) PCT Filed: Apr. 14, 2005

(86) PCT No.: PCT/EP2005/051651
§ 371 (c)(1),
(2), (4) Date: Jan. 25, 2007

(87) PCT Pub. No.: WO2005/115027
PCT Pub. Date: Dec. 1, 2005

(65) Prior Publication Data
US 2007/0213048 A1     Sep. 13, 2007

(30) Foreign Application Priority Data

May 19, 2004  (DE) ................ 10 2004 024 869

(51) Int. Cl.
*H04L 29/06* (2006.01)
(52) U.S. Cl.
CPC ......... *H04L 63/104* (2013.01); *H04L 2463/101* (2013.01)
(58) Field of Classification Search
CPC ..... H04W 48/18; H04W 48/20; H04W 48/08; H04W 4/00
USPC ................. 455/410, 436, 439, 442; 370/331
See application file for complete search history.

(56) References Cited

U.S. PATENT DOCUMENTS

| 5,999,811 | A | 12/1999 | Mölne et al. |
| 6,148,198 | A | 11/2000 | Anderson et al. |
| 2002/0039892 | A1* | 4/2002 | Lindell ............... 455/151.1 |
| 2002/0154632 | A1* | 10/2002 | Wang et al. ............... 370/389 |

(Continued)

FOREIGN PATENT DOCUMENTS

| DE | 198 23 074 A1 | 11/1999 |
| DE | 101 33 590 A1 | 10/2002 |

(Continued)

OTHER PUBLICATIONS

DRM Architecture, Candidate Version 2.0—Jul. 15, 2004, Open Mobile Alliance OMA-DRM-ARCH-V2_0-20040715-C, hereinafter OMA.*

(Continued)

*Primary Examiner* — George Eng
*Assistant Examiner* — Jing Gao
(74) *Attorney, Agent, or Firm* — Laurence A. Greenberg; Werner H. Stemer; Ralph E. Locher (57) ABSTRACT

In a method for prioritizing telecommunications networks in a telecommunications terminal, a user data object is stored in the telecommunications terminal, and the user data object is assigned an access parameter which permits access to the user data object depending on which telecommunications network the telecommunications terminal is registered into. The telecommunications networks are prioritized using the access parameter.

18 Claims, 2 Drawing Sheets

(56) References Cited

U.S. PATENT DOCUMENTS

| | | |
|---|---|---|
| 2003/0003922 A1* | 1/2003 | McClure .................. 455/456 |
| 2003/0003933 A1* | 1/2003 | Deshpande et al. .......... 455/510 |
| 2003/0065738 A1* | 4/2003 | Yang et al. .................. 709/215 |
| 2004/0039704 A1 | 2/2004 | Gilliam et al. |
| 2004/0148408 A1* | 7/2004 | Nadarajah .................. 709/229 |
| 2004/0187014 A1* | 9/2004 | Molaro ...................... 713/200 |
| 2004/0199648 A1* | 10/2004 | Shelest et al. ............... 709/229 |
| 2005/0037755 A1* | 2/2005 | Hind et al. ................ 455/435.3 |
| 2005/0277403 A1 | 12/2005 | Schmidt et al. |

FOREIGN PATENT DOCUMENTS

| | | |
|---|---|---|
| DE | 102 39 062 A1 | 4/2004 |
| WO | WO 01/58190 | 8/2001 |

OTHER PUBLICATIONS

DRM Architecture, Draft Version 2.0—Mar. 15, 2004, Open Mobile Alliance OMA-DRM-ARCH-V2_0-20040315-D.*

* cited by examiner

METHOD FOR PRIORITIZING NETWORKS IN A TELECOMMUNICATIONS TERMINAL HAVING DIGITAL RIGHTS MANAGEMENT CHARACTERISTICS

BACKGROUND OF THE INVENTION

Field of the Invention

The present invention relates to a method for prioritizing networks in a telecommunications terminal, wherein a user data object is stored in the telecommunications terminal and wherein an access parameter is associated with the user data object.

A method is known from the prior art, and has been at least partly specified by the "Open Mobile Alliance" (OMA), with which digital content on mobile communications terminals can be protected from access by unauthorized users and defined rights to use the content can be granted to authorized users. This method is known as "Digital Rights Management" (DRM).

Hitherto three different methods of rights management for digital content, such as so-called "media elements" (files with digital image, text, audio data and/or other multimedia data) have been defined and agreed by the "Open Mobile Alliance" in several specifications. The three specified methods are specifically:

"Forward Lock": The media element(s) are packaged in a new data type which contains certain signaling information in addition to the media elements. The restriction is placed on the new data type ("application/oma.drm-.message" according to the OMA specification) that the objects contained therein may not be forwarded, may not be stored in a freely accessible manner in the file system, and may not be modified. Special treatment of objects of this type by a terminal is therefore required.

"Combined Delivery": The media elements are packaged in the same data type as for "Forward Lock". Additionally contained therein is another rights description with which further restrictions in respect of the use of the digital media objects can be stipulated. Examples include limitations on usage time, usage frequency, type of usage (e.g. "do not print").

"Separate Delivery": The media objects are encrypted into another new data type ("application/oma.drm.content" according to the OMA specification, hereinafter also referred to as DRM container (DRMC)) which again contains some signaling information. Encryption enables the content to be protected from unauthorized use even if it is handled by an application without specific DRM functionality and is stored in the freely accessible memory area of a terminal. In addition, a rights object is transmitted to the recipient via a secure channel. In the textual coding it has the data type "application/vnd.oma.drm.rights+xml" according to the OMA specification and in the binary coding the type "application/vnd.oma.drm.rights+wbxml".

In the two methods "Combined Delivery" and "Separate Delivery" the rights object (RO) plays a central role. This object contains the information concerning the permissions attached to a content object (the rights description) and also the key for decrypting the encrypted content object in the DRMC when using the "Separate Delivery" method.

The definition of the rights object is given by the specification OMA-Download-DRMREL-v1_0-20020913-C in conjunction with an XML DTD (extensible Markup Language Document Type Definition) which can be retrieved from http://www.openmobilealliance.org/docs/drmre110.dtd.

The current version of the definition for a rights object contains a number of permissions and constraints. The permissions include:

"Play" (for audiovisual content),
"Display" (for visual content (images, video)),
"Execute" (for executable programs) and
"Print" (for creating a hardcopy of content, such as images, texts or graphics).
The constraints so far defined relate to
the number of permitted usages
or a permitted usage duration. This can either be defined by
a start and end time (absolute or relative to the start time)
or also defined by a maximum accumulated usage time.

With the "Separate Delivery" method the content object (the media object to be protected) is contained in the DRM container. This has two components: on the one hand the encrypted content object and, on the other, a header containing control information and a description of the content object. The control information includes a reference ("Rights Issuer") to the rights provider (RA) which can be used by the terminal in order to obtain further permissions for the content object, and a unique reference, the so-called "ContentURI", which is used for referencing the content object from the rights object. This reference (in the form of a URI) is used in the rights object as a reference in order to display the connection between rights object and content object.

The DRM described thus far is defined by the Open Mobile Alliance in the specifications "Digital Rights Management". Open Mobile Alliance: OMA-Download-DRM-v1_0,
"DRM Rights Expression Language". Open Mobile Alliance: OMA-Download-DRMREL-v1_0 and
"DRM Content Format". Open Mobile Alliance: OMA-Download-DRMCF-v1_0.

A disadvantage of the prior art is that the methods known therefrom do not allow usage rights for such digital content to be linked to a user's environment, such as his whereabouts, certain mobile networks or technical constraints.

SUMMARY OF THE INVENTION

The object of the present invention is therefore to make it more convenient for the user of a mobile telecommunications terminal to use digital content of this kind, the use of which is linked to the user's environment.

This object is achieved by a method for prioritizing telecommunications networks in a telecommunications terminal,
wherein a user data object is stored in the telecommunications terminal,
wherein the user data object is assigned an access parameter which permits access to the user data object depending on which telecommunications network the telecommunications terminal is registered into,
wherein the telecommunications networks are prioritized using the access parameter.

By assigning an access parameter which permits or prohibits the use of a user data object depending on which telecommunications network the telecommunications terminal is registered into, it becomes possible to link the use of a user data object to the user's environment. Due to the fact that this information is used to prioritize telecommunications networks, the user of the mobile telecommunications terminal is afforded convenient means of using the user data object. For prioritization, the access parameter alone can be used, for example. In addition, however, other criteria as well as the access parameter can also be taken into account for prioritization. Such further criteria can be, for example, tariff-related aspects or network availability.

For example, prioritization can be performed in such a way that a telecommunications network in which the use of the user data object is permitted according to the access parameter is given a higher priority than a telecommunications network in which use of the user data object is not permitted. This information enables a telecommunications network to be selected e.g. from a number of offered telecommunications networks in such a way that the user data object can also actually be used in the telecommunications terminal. The user of the telecommunications terminal does not therefore need to make any undue effort to use the user data object.

The telecommunications networks can be prioritized, for example, in such a way that the mobile telecommunications terminal checks various telecommunications networks available at the location of the telecommunications terminal for permission to use the user data object in the particular telecommunications network, and those networks which permit the user data object to be used are given higher priority than those which do not permit the user data object to be used. When selecting a telecommunications network, those with higher priority, in particular a telecommunications network with the highest priority, are selected on a preferred basis. A plurality of telecommunications networks may have the same priority, particularly also the same highest priority. When selecting a telecommunications network from a number of networks of equal priority, other selection criteria can also be used such as tariff criteria or network availability.

Prioritization can be performed, for example, in an order of consecutive priorities or as sorting into predefined priority classes (e.g. into a class for networks with higher priority, a class for networks with medium priority and a class of networks of low priority). The priority can be stored e.g. together with the telecommunications network in the telecommunications terminal. In addition, prioritization can also be performed in such a way that, when selecting a telecommunications network, a telecommunications network is selected according to a priority temporarily assigned as part of that specific selection without permanent storage of the priority and the priority is re-determined for subsequent selection of a telecommunications network.

Telecommunications networks may be implemented, for example, as fixed networks, as mobile networks or even as local radio networks such as Bluetooth or WLAN networks or DECT networks. Mobile networks can be set up, for example, according to the GSM, UMTS, CDMA 2000 or similar standards, or also combinations thereof. Telecommunications terminals can be, for example, fixed network telephones, cell phones, hand-held devices with a telecommunications module, computers with a telecommunications module (e.g. with a mobile communications modem or a fixed network modem) and any kind of terminals which are connected or can be connected to fixed network data lines such as a telephone network or a data network.

User data objects can be, for example, any kind of multimedia data such as image, audio and/or text data. In addition, user data can also be any kind of application such as computer programs or other software applications such as C-applications, Java applications, SIM toolkit applications (STK applications) or similar.

An access parameter which permits access to the user data object depending on the telecommunications network into which the telecommunications terminal is registered can be, for example, network-related, technical and/or a geographical permission information.

Network-related permission information can be, for example, the limitation of use of the user data object to telecommunications networks of one or more mobile operators or also the exclusion of use of the user data object in networks of one or more network operators.

Technical permission information can be, for example, information about a radio standard used (such as e.g. GSM; UMTS, CDMA 2000, WLAN, and/or Bluetooth). In addition, technical permission information can also be, for example, information about the presence of particular technical requirements of the telecommunications network, such as the presence of special optional attributes or services (e.g. presence of multimedia messaging in a mobile network, presence of "High Speed Downlink Packet Access" (HSDPA) in a UMTS network or similar).

Geographical permission information can be, for example, information about the permissibility of using a user data object in particular countries or regions. An access parameter can also include a plurality of items of permission information of this kind such as, for example, the combination of a network-related and a geographical access parameter, e.g. the restriction of use of a user data object to a particular network operator in a particular country.

It can be provided, for example, that a user must be staying at a location within a defined area in order to obtain the right to access the corresponding content. The corresponding restriction can be defined either by a geographical condition or the definition is described indirectly by requiring that a user's terminal be registered into a particular mobile network or into one of a plurality of possible mobile networks, a coverage region being defined indirectly with the mobile network(s). On the one hand, a restriction e.g. to a country can be imposed by only granting the rights if the mobile terminal is registered into one of the networks available in that country, whereas on the other hand a restriction to a particular network operator can also be imposed by only granting the rights if the mobile terminal is registered into a network of that mobile network operator. For example, by restricting the rights to his own mobile networks in particular countries, a network operator can motivate the users to be preferably registered into one of his own networks with their mobile telephone even when abroad if they wish to use particular DRM-protected content (DRM: "Digital Rights Management").

An access parameter can be implemented in such a way that it describes conditions subject to which use of a user data object is permitted. In addition, it can also be implemented such that it specifies conditions subject to which use of the user data object is not permitted. In the case of a plurality of items of permission information, both possibilities can be present simultaneously within an access parameter.

For example, if a user wishes to use a specific user data object, the telecommunications terminal can attempt to register into a telecommunications network in which access to the user data object is permitted according to the access parameter. In this context it can be provided that the telecommunications terminal attempts to register into a telecommunications network with as high a priority as possible. It can also be provided that the telecommunications network [sic] actually attempts not to register into a low-priority telecommunications network.

In connection with the above-described method, the telecommunications terminal can also automatically attempt to register into the telecommunications network used. In this case, for example, a user could only enter the wish to use the user data object in the telecommunications terminal and the telecommunications terminal could automatically perform selection of a suitable telecommunications network. This increases the user friendliness of such user data objects with permission limitations. For example, in order to make sure that the telecommunications terminal does not register into a network not wanted by the user (which is e.g. too expensive for the user), it can be provided, for example, that prior to registering in, the telecommunications terminal issues a message to the user indicating which telecommunications network it intends to register into. By agreeing, the user can then initiate registering in. By refusing, he can e.g. initiate selection of an alternative telecommunications network or even abort connection setup.

In addition, for example, the telecommunications terminal can, prior to registering into a telecommunications network used, already be registered with another telecommunications network. It is then advantageous, e.g. in connection with the wish to use a user data object, if the telecommunications terminal automatically de-registers from the previous telecommunications network. It can then register e.g. according to the method described in the previous paragraph into a telecommunications network in which it is permissible to use the user data object in accordance with the access parameter. This embodiment likewise provides a high degree of user convenience for using user data objects.

In a further embodiment it can be provided that at least one preferred telecommunications network which is permitted according to a maximum number of access parameters present in the telecommunications terminal receives the highest priority, it being possible for there to be e.g. one access parameter. In addition, a plurality of access parameters can also be present. In the latter case the telecommunications network or networks permitted under a maximum possible number of access parameters are given the highest priority.

In addition, a correspondingly complementary method can also be used wherein the at least one least preferred telecommunications network which is impermissible according to a maximum number of access parameters present in the telecommunication terminal would be given the lowest priority.

The telecommunications terminal can then attempt, for example, to register into a telecommunications network with the highest priority or attempt not to register into a telecommunications network with the lowest priority. In the case of a plurality of telecommunications networks having the highest priority, further criteria (such as particularly low prices for calls or texts (e.g. SMS (Short Message Service) for cellular)) can play a part in selecting the telecommunications network into which the telecommunications terminal attempts to register. If it is not possible to register into the telecommunications network selected in this way, the telecommunications terminal can attempt to register into another (if any) telecommunications network with the highest priority or attempt to register into a telecommunications network with the next lower priority. This means that, of the networks actually available, the telecommunications terminal is registered into the one that is most suitable for using one or more user data objects in the telecommunications terminal.

Prioritization can also be performed within the framework of a list. In this case, telecommunications networks permitted according to the access parameter or the access parameters present in the telecommunications terminal can be entered or resident in a preferred networks list held in the telecommunications terminal and/or in the telecommunications network. Within such a list, for example, telecommunications networks permitted according to one or more access parameters can be given higher priority than those that are not permitted according to the one or more access parameters.

Within the set of telecommunications networks permitted by at least one access parameter, it can additionally be provided that the highest priority is given to the telecommunications networks that are permitted according to a maximum number of access parameters. Further prioritization then takes place in descending order of the access parameters under which the telecommunications networks are permitted in each case.

In addition, the lowest priority within such a list can be assigned, for example, to the at least one telecommunications network which is not permissible under a maximum number of access parameters. Once again the further hierarchy can be created according to the number of impermissible access parameters. Within the list, particularly in the case of telecommunications networks of equal priority, further prioritization parameters can also be used, such as particular desired network operators or necessary technical characteristics.

When registering into a telecommunications network, the telecommunications terminal can read off the highest or one of the highest priority telecommunication networks from the list of preferred telecommunications networks and attempt to register into it. If this is unsuccessful, it can additionally be provided that the telecommunications terminal uses a telecommunications network with the next lower priority or a telecommunications network with identical priority as the next destination network.

Using such a list is advantageous, for example, in the case where the user wants to register into a telecommunications network without specifically intending to use a user data object of only restricted usability. In this case, by using the above-described method it can be achieved that the user registers into a telecommunications network which has a high probability that the user data objects stored in the telecommunications terminal can also actually be used without registering into another network.

In addition, according to the above-described list of preferred telecommunications networks, a corresponding negative list can also be used. Such a list contains those telecommunications networks that are impermissible according to at least one access parameter stored in the telecommunications terminal. Prioritization of such a list takes place analogously to the above-described prioritization of the positive list.

Telecommunications network selection can be further improved for a user by using, in addition to the above-mentioned prioritization parameters, the information as to the telecommunications network into which the telecommunications terminal was last registered. This information can be used, for example, in such a way that in the case where a plurality of telecommunications networks have the same priority according to the other above-mentioned parameters, the telecommunications terminal first attempts to register into the last telecommunications network used by the user. Such a method makes the use of the telecommunications terminal even more user-friendly, if possible in a familiar telecommunications environment.

It can additionally be provided as part of the cited method that the telecommunications terminal always registers into the telecommunications network with which the telecommunications terminal was last registered as long as the use of one or more user data objects is possible in this telecommunications network.

The above-mentioned object is additionally achieved by a telecommunications terminal having a control device for performing a method according to the above description. The controller can incorporate a microprocessor, for example. In addition, the control device can also incorporate a memory assigned to the microprocessor which can be designed e.g. to store a software application running in the microprocessor. Such a control device can also incorporate e.g. a so-called DRM agent (DRM: Digital Rights Management). Such a DRM agent can be implemented, for example, as a software application for controlling all the processes on the telecommunications terminal which play a part in terms of access rights to user data objects (so-called DRM-relevant processes). Such a DRM agent can also undertake management of DRM-protected objects.

In addition, the telecommunications terminal can incorporate a memory device, said memory device being implementable for storing the list of preferred telecommunications networks and/or the list of impermissible telecommunications networks. The memory device can also be at least partially implemented as a removable memory module (e.g. a multimedia card or a SIM card), the list of preferred or impermissible telecommunications networks being at least partially storable on the removable memory module. In addition, the DRM agent can also be at least partially stored on the removable memory module.

A removable memory module of this kind has the added advantage for the user that uniform use of network resources is possible, for example, when using a plurality of telecommunications terminals. Moreover, particular pre-settings need only be performed once by the user and can then be transferred between different telecommunications terminals by means of the removable memory module.

The above object is additionally achieved by the removable memory module for the telecommunications terminal, e.g. for storing a list of preferred and/or impermissible telecommunications network and/or for at least partly storing a DRM agent, the specified files in each case also being able to be stored only partly on the removable memory module.

One or more access parameters for the user data object can be incorporated, for example, in a so-called "Digital Rights Management (DRM)" rights object for a corresponding user data object, e.g. an image, audio and/or text file. Such rights objects can, for example, be directly linked with the user data object (e.g. in the case of the OMA-specified "Forward Lock" and "Combined Delivery" methods mentioned in the introduction) or can be present as separate files (e.g. in the case of the OMA-specified "Separate Delivery" methods mentioned in the introduction).

Network-related access parameters can, for example, be integrated into a DRM rights object on the basis of identifications specified for the networks. In addition, identifications for particular categories of networks can also be defined (e.g. all the networks of a particular network operator) or for mobile communication systems in general, making it possible to restrict the rights to one or more mobile communication systems (GSM, GPRS, UMTS, CDMA, PCS, etc.). This means that, for example, DRM-protected software can be restricted to use on UMTS terminals because e.g. a high data transfer rate is required on the network and this can only be achieved with UMTS.

The DRM agent already described above can be implemented, for example, as a software application for controlling all the DRM-relevant processes on the unit and for managing DRM-protected objects in DRM containers and DRM rights objects. A DRM agent of this kind can be stored in a memory on the communications device, for example in a mass memory of the telecommunications terminal. The DRM agent can then administer a list of preferred networks on the telecommunications terminal. This can be the list already usual for telephony services on mobile communications devices, but can also be a new additional list as claimed in the invention, in which only the networks having a relation to DRM rights objects are entered.

Network and/or mobile communication system IDs can be integrated into a DRM rights object as a single entry or as a list of networks/mobile communication systems, it being possible to generate a positive list containing the IDs of the permitted networks and also to create a negative list containing the IDs of networks/mobile communication systems that are not permitted. If both lists are present, the DRM agent can, for example, deduce which networks are to be preferred by taking into account the entries in both lists.

In accordance with the above described lists containing network IDs, the DRM agent can control the network selection unit of the mobile communications terminal in such a way that a network is selected with which as many rights as possible of DRM containers present on the terminal will permit access to the protected content, or so that usage of the object(s) which the user is most likely to use next is enabled without if possible re-registering the terminal into another network. If forward-looking selection of a suitable network is not possible in a specific case, for user-initiated or automatic requesting of specific rights to a DRM-protected object the DRM agent can check whether the rights can be granted by re-registering the terminal into another network. If so, the DRM agent can, for example, either initiate appropriate re-registration into the required network without referring to the user or can request the user's consent to re-register and, after the user has decided, can respond either by re-registering or refusing to grant the requested rights.

Advantages of the above described method are, for example, that it is possible to incorporate restrictions for particular networks and/or mobile communication systems into the DRM container itself. Another advantage is the possibility of automatically providing or initiating a correspondingly analog functionality of the DRM agent to fulfill the restriction as already described above with reference to the rights objects, e.g. registration of the mobile communications terminal into a required network/mobile communication system on a forward-looking basis or on request. The background here is that for user-friendly charging for downloading new rights objects in a data transfer via a selected network, the charging for the data transfer itself can be suppressed, for example, enabling better cost transparency for the user.

Embodiment 1

Restricting Use to One Network

In the simplest case, usage of a DRM-protected object can be restricted to use in one network. Only if the user's terminal is registered or was last registered with that network before the user lost network coverage does the DRM agent grant the user rights, when requested, to use the content according to the further restrictions. If the terminal is registered into a network other than the required network when the request is made, the DRM agent causes the network selection unit—possibly after receiving a user confirmation—to automatically re-register into the required network. The permissions to use the DRM-protected object are then granted by the DRM agent.

Embodiment 2

Restricting Use to a Plurality of Networks

The use of a DRM-protected object be also can restricted to use in more than one network. Only if the user's terminal is registered or was last registered with that network before the user lost network coverage does the DRM agent grant the user rights, when requested, to use the content according to the further restrictions.

A distinction can be drawn between two variants:

Variant A: All the Networks of a Network Operator

Many mobile phone companies operate several mobile communications networks and also have a presence in several countries. It is in their interest that their customers are registered into another network of the same provider when abroad. For example, let us assume that company A operates mobile communications networks in the UK, Germany, and many other countries. Company A can provide DRM-protected content which may only be used if the user's terminal is registered into a network of company A. If a customer of company A is staying abroad and has one or more DRM-protected objects on his terminal which may only be used in a network of company A, the terminal preferably and automatically registers into a network of company A if one is available.

Company A then benefits directly from charges accruing for calls and/or data traffic. This is an advantage for the network operator who can, for example, improve customer retention via additionally provided DRM-protected content. It also be an advantage for the user if company A, for example, designs the call charges for roaming mobile users in his own networks more favorably than for the networks of competing providers. The terminal's above-described new, automatic network selection has no disadvantages for the user in the handling of the DRM-protected content due to the additional restrictions in respect of the required networks. The terminal automatically ensures for him that the conditions required for granting the rights are met—assuming a required network is also available.

Variant B: All the Networks of a Geographical Region

A large amount of content such as music tracks and video films is subject to marketing restrictions relating to particular regions—typically states. The provider of such content often only has marketing rights in particular states. With the proposed method, this can be readily implemented by restricting the rights for the DRM-protected content to all networks that are available, for example, in the desired region/state. Only if the user's terminal is registered into one of the required networks, i.e. the user is effectively staying in the required region/state, are the rights granted. The advantage of this is that even content subject to the described restrictions can generally be provided, as with this variant compliance with the restrictions can be ensured. With automatic network selection, the user can be granted access to the content without restricting convenience of use.

Embodiment 3

Restricting the Use of Streaming Content to One Network

If the DRM-protected content is, for example, streaming content, i.e. content which is transmitted to the terminal during use via the air interface, only a description of the streaming content and the necessary access parameters could be transmitted, for example, in the DRM container (e.g. by "Session Description Protocol"—SDP). The content is used by transmission of the actual user data over the air interface. Restriction of use to particular networks and/or particular mobile communication systems is useful here, for example, so that on the one hand sufficient transmission quality and bandwidth can be ensured and, on the other, service-specific charging can also be applied, which is often only possible if the streaming content provider and the network operator collaborate or are identical. This makes it possible to bill the transmitted data otherwise than usual. For example, music tracks can be transmitted at a fixed price in order to provide the user with a transparent, easily comprehensible charging model.

With the above described method for automatic network selection, disadvantages for the user due to the additional network restrictions can be avoided, for example by the terminal attempting, on a forward-looking basis or even automatically in response to a usage request for the DRM-protected content to ensure that the usage conditions are met by registering the terminal into a required network.

Embodiment 4

Restricting Automatic Requesting of Rights to Particular Networks

A restriction for particular networks/mobile communication systems can also be incorporated in a DRM-container in addition to the rights object. The restriction is then interpreted, for example, in such a way that access to network resources for the purpose of obtaining new rights objects shall only take place automatically if the terminal is registered into the required network/mobile communication system or into one of the required networks/mobile communication systems. Accesses in order to request rights objects from the rights provider may also be automatically possible by the terminal over the air interface if, for example, the content of a rights object can be downloaded free of charge for a "preview" or if, for example, further rights can be downloaded free of charge as part of an existing contractual relationship. For this purpose, references with which the DRM agent downloads the corresponding rights objects from the rights provider automatically and without the user needing to intervene can be incorporated into the DRM container.

It is particularly advantageous for the user if the rights provider ensures in conjunction with the network operator that data transfer is not charged or only charged at a lower rate than normal. It is possible, for example, for the DRM agent to download the rights for a preview of the DRM-protected object completely free of charge. This variant can be supported by the above described method, for example, by the DRM agent examining the DRM container for any restrictions, analyzing the restrictions found, incorporating the networks/mobile communication systems required or to be avoided into the corresponding lists in the terminal and initiating registration/re-registration of the terminal into one of the required networks prior to using the references for automatic downloading of other rights objects. This enables the user to be offered a convenient service in which the costs are minimized and convenience is maximized.

Further preferred embodiments are contained in the subclaims.

BRIEF DESCRIPTION OF THE DRAWINGS

The invention will now be explained in greater using further examples with reference to the accompanying drawings in which.

DESCRIPTION OF THE PREFERRED EMBODIMENTS

Figure 1:
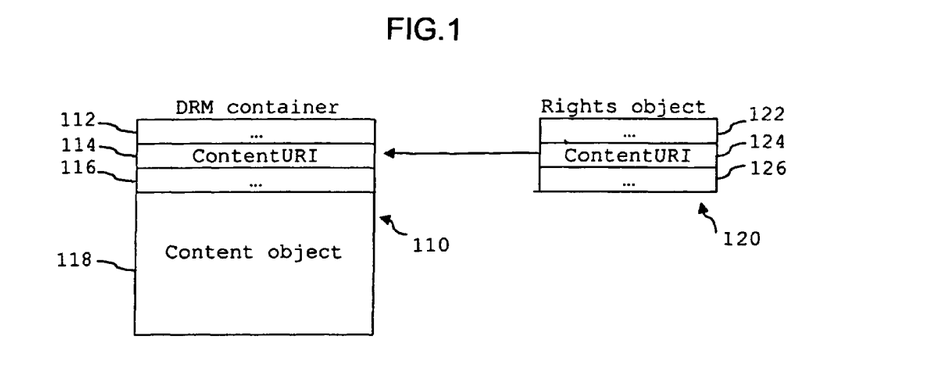
FIG. 1: shows referencing of the content object by a rights object according to the "Separate Delivery" method.

FIG. 1 shows a DRM container 110 and an associated DRM rights object 120 as used according to the Open Mobile Alliance (OMA) "Separate Delivery" method mentioned in the introduction. In the context of this description the abbreviation DRM means "Digital Rights Management" and is used for methods and devices associated with the creation, management and execution of access rights to digital data.

In addition to the actual user data 118 and various description data 112, 116 associated with same, the DRM container 110 contains a so-called "Content URI" associated with the user data 118. The DRM container 110 consequently has two components: on the one hand the encrypted content object 118 and, on the other, a header 112, 114, 116 containing control information and a description of the content object 112, 116. The control information 112, 116 includes, for example, a reference to the provider of digital access rights which can be used by a telecommunications terminal in order to obtain further digital rights for the content object 118. The control information 112, 114, 116 additionally includes the unique reference 114, the so-called "Content URI" 114, which is used for referencing the content object 118 from the assigned rights object 120.

A corresponding reference 124 is also contained in the associated rights object 120 and is used to establish the link between rights object 120 and DRM container 110. In addition to the "Content URI" 124, the rights object 120 contains yet more descriptions of the associated rights and encryption information 122, 126.

According to the above description, the DRM container 110 and/or the content object 118 shown in FIG. 1 are examples of user data objects. Access parameters can be, for example, the rights object 120, or also the information blocks 122, 124, 126 contained therein. In addition, access parameters can also be the information blocks 112, 114, 116 contained in the control information blocks 112, 114, 116 of the DRM container 110.

Figure 2:
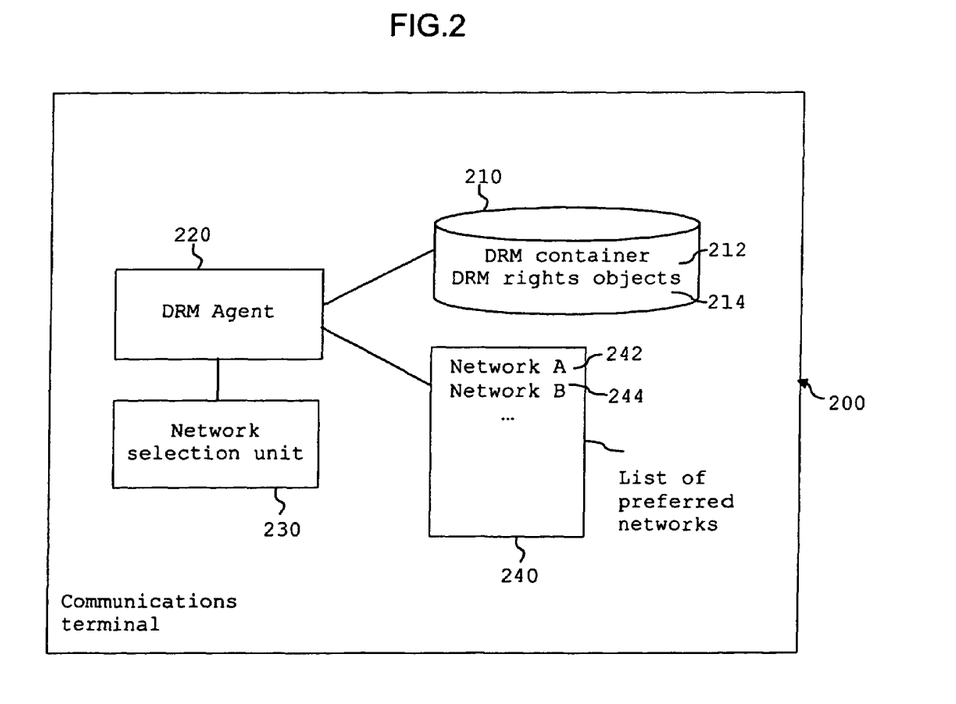
FIG. 2: shows a block diagram of a communications terminal.

FIG. 2 shows a communications terminal 200 which is set up to carry out one of the above-described methods. The communications terminal comprises a DRM container 212 and a rights object 214 (access parameter) associated with the DRM container 212 (user data object), both being stored in a memory device 210 of the communications terminal 200. Additionally provided in the communications terminal 200 is a DRM agent 220 which controls the usage of the corresponding digital rights.

The DRM agent 220 is additionally connected to a memory device 240 for storing a list of preferred telecommunications networks 242, 244. In this device are stored telecommunications networks 242, 244 which can be used by the telecommunications terminal 200. The telecommunications networks 242, 240 contained in the memory 240 are prioritized among other things by the DRM agent 220. The latter organizes prioritization in such a way that the at least one network 242 receives the highest priority, that a maximum number of access parameters 214 contained in the memory device 210 for the user data objects 212 are fulfilled. Additionally connected to the DRM agent 220 is a network selection unit 230 which performs dial-in to a particular telecommunications network.

Figure 3:
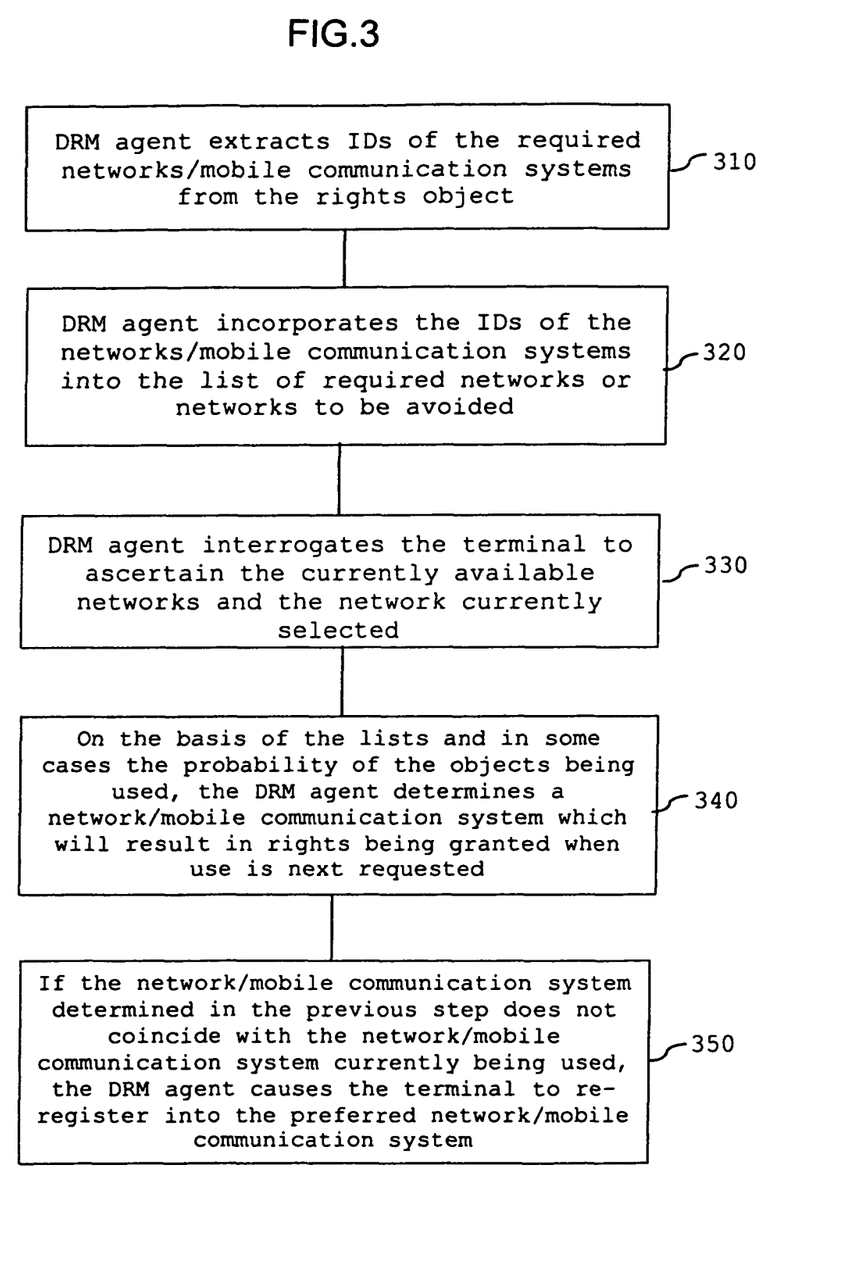
FIG. 3: shows operating steps of a DRM agent.

An example of a functional sequence within the communications terminal 200 shown in FIG. 2 is illustrated in FIG. 3. In a first step 310, the DRM agent extracts the IDs of the required networks or also mobile communication systems from the rights object. In a second step 320, the DRM agent incorporates these IDs in a list of required networks or a list of networks to be avoided. In the next step 330, the agent interrogates the telecommunications terminal to ascertain the currently available networks and the currently selected network. In step 240, the DRM agent then determines, on the basis of the lists and in some cases the usage probability of the objects, a network or a mobile communication system which, at the next request for use, will result in the granting of digital rights. In the last step 350 shown in FIG. 3, the DRM agent causes the terminal to re-register into the telecommunications network determined in step 340 if the network or mobile communication system determined in step 340 do not coincide with the currently used network or mobile communication system.

The present invention describes a method for prioritizing telecommunications networks in a telecommunications terminal, wherein a user data object is stored in the telecommunications terminal and the user data object is assigned an access parameter which permits access to the user data object depending on the telecommunications network into which the telecommunications terminal is registered and wherein the telecommunications networks are additionally prioritized using the access parameter among other things. The telecommunications networks can also be a single telecommunications network, prioritization then indicating whether or not said telecommunications network is suitable for one or more user data objects in the telecommunications terminal. This method provides the user of the telecommunications terminal with convenient use of user data objects, access to which is restricted by conditions derived from the user's environment, such as the communications network used, the transmission systems used or the geographical environment.

I claim:

1. A method for prioritizing telecommunications networks in a telecommunications terminal, which comprises steps of:
    storing a user data object in the telecommunications terminal;
    assigning the user data object an access parameter permitting a user of the telecommunications terminal access to the user data object depending on which telecommunications network the telecommunications terminal is registered into; and
    prioritizing the telecommunications networks using the access parameter; and
    incorporating the access parameter into a digital rights management object corresponding to the user data object;
    wherein the user data object is in a digital rights management container.

2. The method according to claim 1, which further comprises forming the access parameter to contain at least one of network-related information, technical information and geographical permission information.

3. The method according to claim 1, wherein the telecommunications terminal attempts to register into a telecommunications network used in which access to the user data object is permitted according to the access parameter.

4. The method according to claim 3, wherein the telecommunications terminal automatically attempts to register into the telecommunications network used.

5. The method according to claim 3, wherein prior to registering into the telecommunications network used, registering the telecommunications terminal into a previous telecommunications network in which access to the user data object is impermissible according to the access parameter, and leaving the previous telecommunications network automatically.

6. The method according to claim 5, wherein the telecommunications terminal leaves the previous telecommunications network automatically after confirmation by a user.

7. The method according to claim 3, wherein the telecommunications terminal automatically attempts to register into the telecommunications network used, after confirmation by a user.

8. The method according to claim 1, which further comprises giving a highest priority to at least one preferred telecommunications network permitted according to a maximum number of access parameters present in the telecommunications terminal.

9. The method according to claim 8, wherein the telecommunications terminal attempts to register into the preferred telecommunications network with the highest priority.

10. The method according to claim 8, which further comprises entering telecommunications networks permitted according to the access parameter or according to the access parameters present in the telecommunications terminal in a list of preferred telecommunications networks maintained in the telecommunications terminal and/or in telecommunications network.

11. The method according to claim 10, wherein the telecommunications networks permitted according to the access parameter and/or according to the access parameters present in the telecommunications terminal become or are a higher priority than telecommunications networks that are impermissible according to the access parameter and/or according to the access parameters present in the telecommunications terminal.

12. The method according to claim 10, wherein at least two of the access parameters are present and at least one preferred telecommunications network permitted according to the maximum number of access parameters is given the highest priority within the list of preferred telecommunications networks.

13. The method according to claim 10, wherein the telecommunications terminal attempts to register into the preferred telecommunications network from the list of preferred telecommunications networks with the highest priority.

14. The method according to claim 8, which further comprises entering in a list of impermissible communications networks, the telecommunications networks which are impermissible according to the access parameter or according to the access parameters present in the telecommunications terminal.

15. The method according to claim 1, wherein a telecommunications network, into which the telecommunications terminal was last registered, resides or is stored in the telecommunications network and information is used for prioritization and/or to determine a communications network used.

16. A telecommunications terminal, comprising:
a control device; and
the telecommunications terminal programmed to:
store a user data object in the telecommunications terminal;
assign the user data object an access parameter permitting a user of the telecommunications terminal access to the user data object depending on which telecommunications network the telecommunications terminal is registered into; and
prioritize telecommunications networks using the access parameter;
wherein the access parameter is incorporated into a digital rights management object corresponding to the user data object; and
wherein the user data object is in a digital rights management container.

17. The telecommunications terminal according to claim 16, further comprising:
a memory device connected to said control device;
the telecommunications terminal further programmed to:
enter telecommunications networks permitted according to the access parameter or according to access parameters present in the telecommunications terminal in a list of preferred telecommunications networks maintained in the telecommunications terminal and/or in the telecommunications network;
enter in a list of impermissible communications networks, the telecommunications networks which are impermissible according to the access parameter or according to the access parameters present in the telecommunications terminal;
the list of preferred telecommunications networks and/or the list of impermissible telecommunications networks are stored in said memory device.

18. The telecommunications terminal according to claim 17, further comprising a removable memory module connected to said control device, the list of preferred telecommunications networks and/or the list of impermissible telecommunications terminals is further stored at least in part in said removable memory module.

* * * * *